(12) United States Patent
Chen et al.

(10) Patent No.: US 8,883,053 B2
(45) Date of Patent: Nov. 11, 2014

(54) METHOD FOR ISOLATING FLEXIBLE FILM FROM SUPPORT SUBSTRATE

(75) Inventors: Dong-Sen Chen, Douliu (TW);
Hsiao-Fen Wei, Banqiao (TW);
Liang-You Jiang, Taipei County (TW);
Yu-Yang Chang, Hsinchu County (TW)

(73) Assignee: Industrial Technology Research Institute (TW)

( * ) Notice: Subject to any disclaimer, the term of this patent is extended or adjusted under 35 U.S.C. 154(b) by 986 days.

(21) Appl. No.: 12/571,979

(22) Filed: Oct. 1, 2009

(65) Prior Publication Data

US 2010/0267203 A1   Oct. 21, 2010

(30) Foreign Application Priority Data

Apr. 17, 2009 (TW) ................. 98112768 A

(51) Int. Cl.
*B29C 33/58* (2006.01)
*G02F 1/1333* (2006.01)
*G02F 1/136* (2006.01)

(52) U.S. Cl.
CPC *G02F 1/133305* (2013.01); *G02F 2001/13613* (2013.01)
USPC .............................. 264/39; 264/338; 427/133

(58) Field of Classification Search
USPC ............... 264/39, 337, 338, 446, 485, 488; 427/133; 156/242, 246, 247
See application file for complete search history.

(56) References Cited

U.S. PATENT DOCUMENTS

| | | | | |
|---|---|---|---|---|
| 4,263,350 A * | 4/1981 | Valimont | ................... | 427/352 |
| 4,311,766 A * | 1/1982 | Mattor | ................... | 428/514 |
| 4,711,820 A * | 12/1987 | Arkles et al. | ................... | 428/429 |
| 4,775,554 A * | 10/1988 | Ponjee | ................... | 427/133 |
| 6,245,387 B1 * | 6/2001 | Hayden | ................... | 427/341 |
| 6,488,994 B1 | 12/2002 | Haller et al. | | |
| 6,673,287 B2 * | 1/2004 | Breen et al. | ................... | 264/83 |
| 6,777,030 B2 * | 8/2004 | Veerasamy et al. | ................... | 427/249.7 |
| 6,797,795 B2 * | 9/2004 | Byrd | ................... | 528/26 |
| 6,809,169 B2 * | 10/2004 | Byrd et al. | ................... | 528/28 |
| 7,279,401 B2 | 10/2007 | Wong et al. | | |
| 7,910,683 B2 * | 3/2011 | Byrd et al. | ................... | 528/26 |
| 7,915,371 B2 * | 3/2011 | Byrd et al. | ................... | 528/26 |

(Continued)

FOREIGN PATENT DOCUMENTS

JP        2004-250487 A     9/2004
KR     1020080001744        1/2008

(Continued)

OTHER PUBLICATIONS

OA dated May 18, 2012 from corresponding application No. KR 10-2010-0015002.

(Continued)

*Primary Examiner* — James Sanders
(74) *Attorney, Agent, or Firm* — Lowe Hauptman & Ham, LLP

(57) ABSTRACT

Method for isolating a flexible film from a support substrate and method for fabricating an electronic device are provided. The method for isolating a flexible film from a support substrate includes providing a substrate with a top surface. A surface treatment is subjected to the top surface of the substrate, forming a top surface with detachment characteristics. A flexible film is formed on the top surface with detachment characteristics. The flexible film within the top surface with detachment characteristics is cut and isolated.

15 Claims, 19 Drawing Sheets

(56) References Cited

U.S. PATENT DOCUMENTS

| | | | |
|---|---|---|---|
| 2002/0117256 A1* | 8/2002 | McCormack et al. | 156/289 |
| 2007/0059854 A1* | 3/2007 | Huang et al. | 438/30 |
| 2007/0241078 A1* | 10/2007 | Pratt et al. | 216/13 |
| 2008/0053604 A1* | 3/2008 | Kim et al. | 156/247 |
| 2008/0099134 A1* | 5/2008 | Tadakuma | 156/250 |
| 2008/0248334 A1* | 10/2008 | Moriwaki et al. | 428/817 |

FOREIGN PATENT DOCUMENTS

| | | |
|---|---|---|
| KR | 100810708 | 3/2008 |
| KR | 1020080084347 | 9/2008 |
| KR | 100879207 | 1/2009 |
| TW | 200712607 | 9/1994 |
| TW | I220882 | 9/2004 |
| TW | 232975 B | 5/2005 |
| TW | 265606 B | 11/2006 |
| TW | 288493 B | 10/2007 |
| WO | 2007/078130 | 7/2007 |

OTHER PUBLICATIONS

Office Action dated Jul. 24, 2013 from corresponding application No. TW 098112768.
Korean Notice of Preliminary Rejection with an English Translation from corresponding application No. 10-2010-0015002.

* cited by examiner

US 8,883,053 B2

METHOD FOR ISOLATING FLEXIBLE FILM FROM SUPPORT SUBSTRATE

CROSS REFERENCE TO RELATED APPLICATIONS

This application is based upon and claims the benefit of priority from the prior Taiwan Patent Application No. 098112768, filed on Apr. 17, 2009, the entire contents of which are incorporated herein by reference.

BACKGROUND OF THE INVENTION

1. Field of the Invention

The invention relates to a method for isolating a flexible film from a support substrate.

2. Description of the Related Art

Flat panel displays (FPDs) employing a plastic substrate are relatively lighter, thinner and more flexible than other types of FPDs, can be fabricated in large sizes and have become popular.

To fabricate a pixel array substrate of a flexible FPD, a plastic substrate is affixed on a glass substrate, and then the pixel structures (such as thin film transistors) are formed on the plastic substrate. However, one area of technical difficulty in the fabrication process is to efficiently separate the plastic substrate from the glass substrate after the pixel structures are formed.

Specifically, a plastic substrate is apt to tightly bond to a glass substrate since polymeric materials (such as polycarbonate (PC), poly(ethylene terephthalate) (PET), polyimide (PI) etc.) have strong electronegative oxygen atoms, nitrogen atoms, and fluorine atoms which are apt to covalently bond to the hydrogen atoms of the silanol groups of the glass substrate and form hydrogen bonds, as shown in FIG. 1.

U.S. Pat. No. 7,279,401 discloses a method for fabricating a flexible substrate which includes forming a breach between a polymer material layer and a rigid substrate, and injecting a release agent into the breach for isolating the polymer material layer.

TW Patent Appl. No. 200712607 discloses a method for fabricating a flexible substrate which includes forming a release layer on a hard substrate, forming a polymer film on the release layer, and separating the polymer from the hard substrate.

BRIEF SUMMARY OF THE INVENTION

An exemplary embodiment of a method for isolating a flexible film from a support substrate includes providing a support substrate with a top surface, subjecting the top surface of the support substrate with a surface treatment, thereby forming a top surface with detachment characteristics, forming a flexible film on the top surface with detachment characteristics of the support substrate, and isolating the flexible film from the support substrate.

Another exemplary embodiment of a method for isolating a flexible film from a support substrate includes providing a support substrate with a top surface, subjecting the top surface of the support substrate with a surface treatment, thereby forming a top surface with detachment characteristics, disposing a preformed flexible film on the top surface with detachment characteristics of the support substrate, and isolating the flexible film from the support substrate.

An exemplary embodiment of a method for fabricating a flexible electronic device includes providing a support substrate with a top surface, subjecting a part of the top surface of the support substrate with a surface treatment, thereby forming a mold release region, wherein an adhesive region is the part of the top surface beyond the mold release region, forming a flexible film on the top surface, wherein the flexible film covers the mold release region and the adhesive region, forming an electronic element on the flexible film, and cutting the flexible film within the mold release region to isolate a flexible electronic device from the support substrate.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is of the contemplated mode of carrying out the invention. This description is made for the purpose of illustrating the general principles of the invention and should not be taken in a limiting sense. The scope of the invention is best determined by reference to the appended claims.

Figure 1:
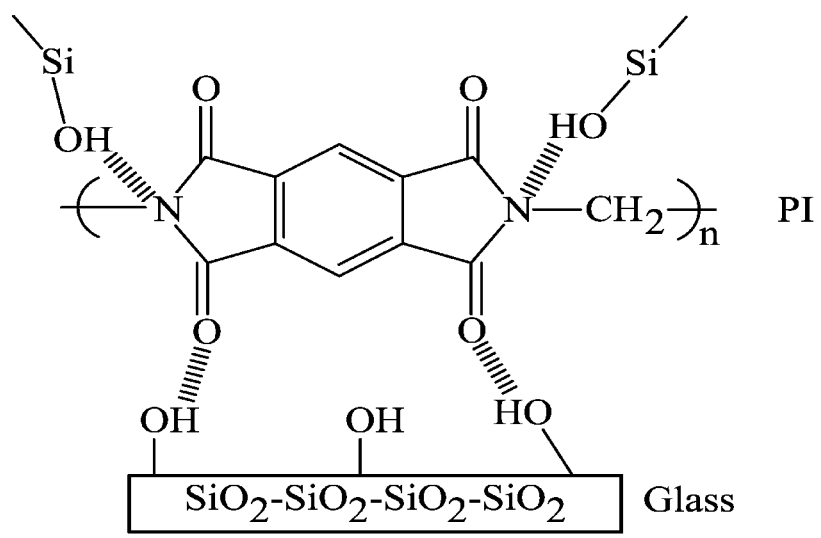
FIG. 1 shows a schematic diagram illustrating the electronegative atoms of the plastic substrate forming hydrogen bonds with the hydroxyl groups of the glass support substrate, thereby forcing the plastic substrate to tightly bonding with the glass support substrate.
Figure 2A:
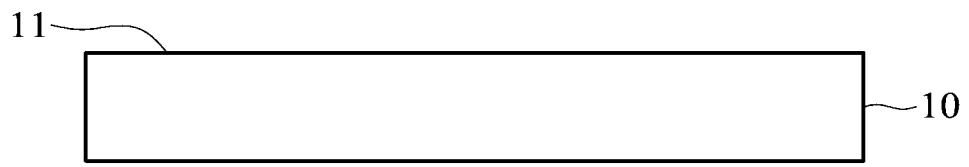
FIGS. 2a-2e are cross sections of a method for isolating a flexible film from a support substrate according to an embodiment of the invention.

First, as shown in FIG. 2a, a support substrate 10 is provided, wherein the support substrate 10 has a top surface 11. The support substrate 10 can be a substrate with sufficient rigidness, such as a metallic substrate, a plastic substrate, a ceramic substrate, a glass substrate, or a silicon wafer. Herein, the support substrate 10 can be a glass substrate.

Figure 2B:
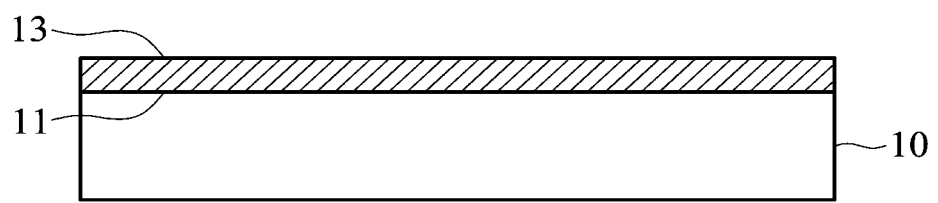
Figure 2C:
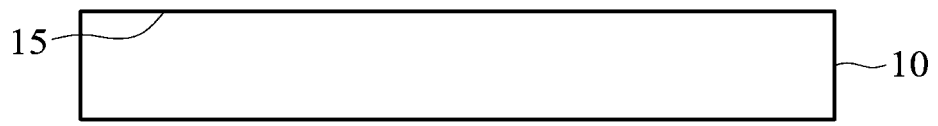

Next, as shown in FIGS. 2b and 2c, the top surface 11 of the support substrate 10 is subjected to a surface treatment to form a top surface with detachment characteristics 15. Herein, the surface treatment can include the steps of providing a chemical agent 13 to react with the top surface 11 of the support substrate 10 (referring to FIG. 2b), and obtaining the support substrate 10 having a top surface with detachment characteristics 15 (referring to FIG. 2c).

Further, according to embodiments of the invention, the surface treatment can also be a plasma treatment, an ion beam bombardment, an electron bombardment, an etching treatment, a rubbing treatment, or combinations thereof. It should be noted that, after subjecting the top surface of the support substrate to the surface treatment, functional groups of the top surface 11 of the support substrate 10, which are able to form bonds with the flexible film, are consumed, covered or displaced. Therefore, the adherence between the top surface with detachment characteristics 15 and a sequentially formed flexible film is greatly reduced. Herein, the functional groups which are able to be bonded with the flexible film can include hydroxyl group, carboxyl group, amino group, or ester group. Further, the bonds formed between the top surface of the support substrate and the flexible film can include ionic bond, covalent bond or hydrogen bond.

According to an embodiment of the invention, the chemical agent 13 can react with the functional groups of the top surface 11 of the support substrate 10 undergoing an addition, elimination, or displacement reaction. The chemical agent can have the structure represented by

Figure 3:
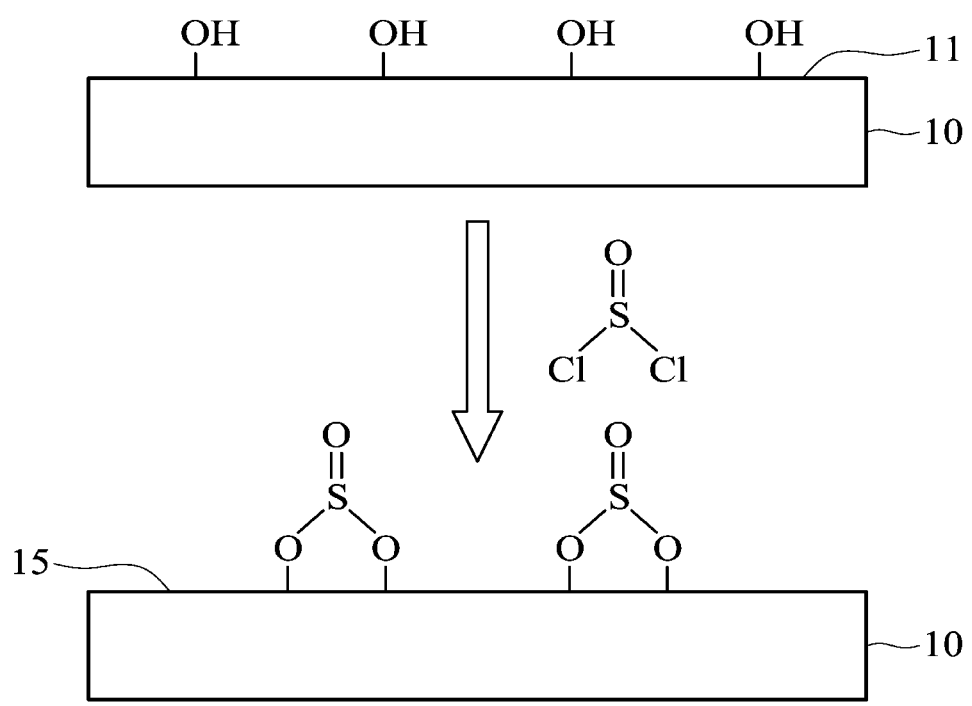
FIG. 3 shows a schematic diagram illustrating non-hydroxyl groups converted from the hydroxyl groups of the support substrate that were subjected to the surface treatment.

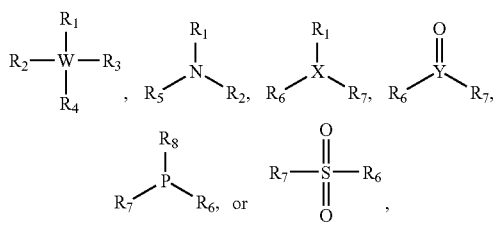

wherein w is C, Si, or Ge; X is S, or Se; Y is C, or S; $R_1$, $R_2$, and $R_3$ are independent and include H, alkenyl group, alkyl group, or —OR; R is $C_{1-18}$ alkyl group; $R_4$ is F, Cl, Br, I, carboxyl group, amino group, amine group, cyano group, amide group, alkyl halide group, or combinations thereof; $R_5$ is Li; and $R_6$, $R_7$, and $R_8$ are independent and include F, Cl, Br, I, alkenyl group, alkyl group, carboxyl group, amino group, amine group, cyano group, amide group, alkyl halide group, or combinations thereof. For example, the chemical agent can include dimethyl chlorosilane, trimethyl chlorosilane, tert-butyl chloride, chloromethyl trimethylsilane, 2-bromopropane, dimethyl dichlorosilane, trimethyl fluorosilane, trimethyl bromosilane, trimethyl iodosilane, trimethylsilyl cyanide, thionyl chloride, triethyl chlorosilane, lithium diisopropylamide, phosphorus trichloride, sulfuryl chloride, tert-butyl dimethylchlorosilane, or combinations thereof. The chemical agent is not limited and can be a liquid agent, a gaseous agent, and a solid agent, preferably a liquid agent. The chemical agent has a boiling point less than 200° C., preferably less than 100° C. Most preferably, the chemical agent is a liquid agent at room temperature. Referring to FIG. 3, the chemical agent (for example: thionyl chloride) can react with the hydroxyl groups of the support substrate 10 (for example a glass substrate). After reaction, the hydroxyl groups are converted to a functional group which is not apt to form a hydrogen bond with a sequentially formed flexible film.

Figure 2D:
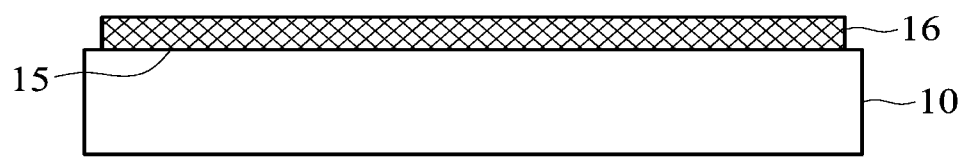

Next, as shown in FIG. 2d, a flexible film 16 is formed on the top surface with detachment characteristics 15 of the support substrate 10. The flexible film can be a polymer film, such as polyimide (PI), polycarbonate (PC), polyethersulfone (PES), polynorbornene (PNB), polyetherimide (PEI), polyethylene naphthalate (PEN) or polyethylene terephthalate (PET). The method for forming the flexible film on the top surface 11 of the support substrate 10 may be by wet coating or evaporation.

Herein, since the functional groups (such as hydroxyl groups), which can form bonds with the flexible film, of the top surface with detachment characteristics 15 of the support substrate 10 are consumed, covered or displaced by the chemical agent, there is no hydrogen atom of a hydroxyl group on the top surface with detachment characteristics 15 to form a hydrogen bond with the flexible film 16.

Figure 2E:
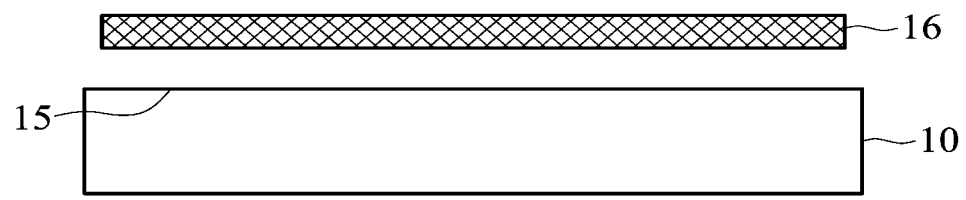

Therefore, in comparison with a surface without the surface treatment, the adherence between the surface with surface treatment and the flexible film 16 is greatly reduced. Finally, as shown in FIG. 2e, the flexible film 16 is isolated from the support substrate 10.

In another embodiment of the present invention, the surface treatment includes a plasma treatment. The top surface of the support substrate is subjected to a plasma treatment, wherein the carrier gas includes argon gas and the reaction gas includes $CF_2$, $CF_3$ or silicon-containing gas. The plasma is formed at atmospheric pressure and can consume or displace the hydroxyl group, forming a top surface with detachment characteristics.

Further, according to an embodiment of the invention, a flexible substrate can be fabricated by the aforementioned method for isolating a flexible film from a support substrate.

Figure 4A:
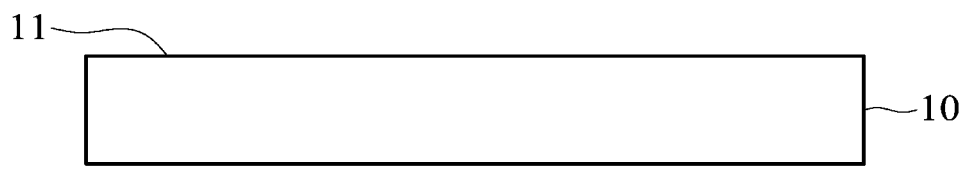
FIGS. 4a-4e are cross sections of a method for fabricating a flexible substrate according to an embodiment of the invention.
Figure 4B:
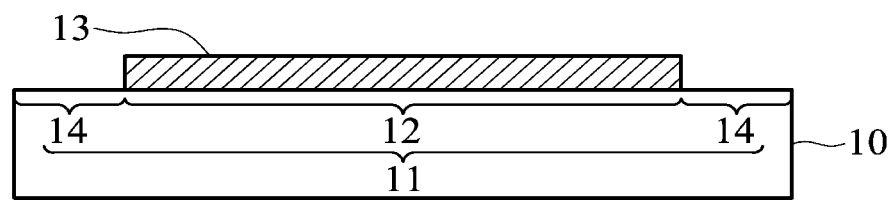
Figure 4C:
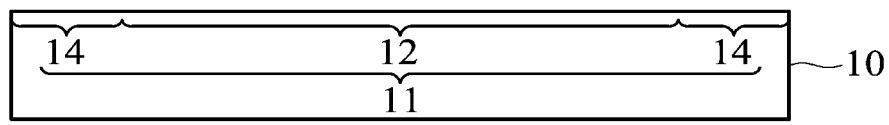
Figure 5:
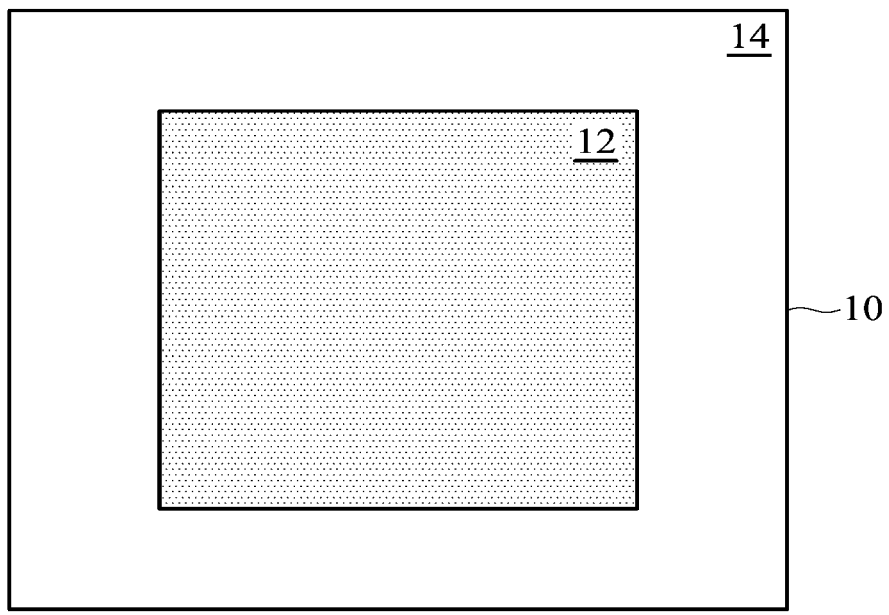
FIG. 5 is a top view of the structure shown in FIG. 4c.
Figure 6:
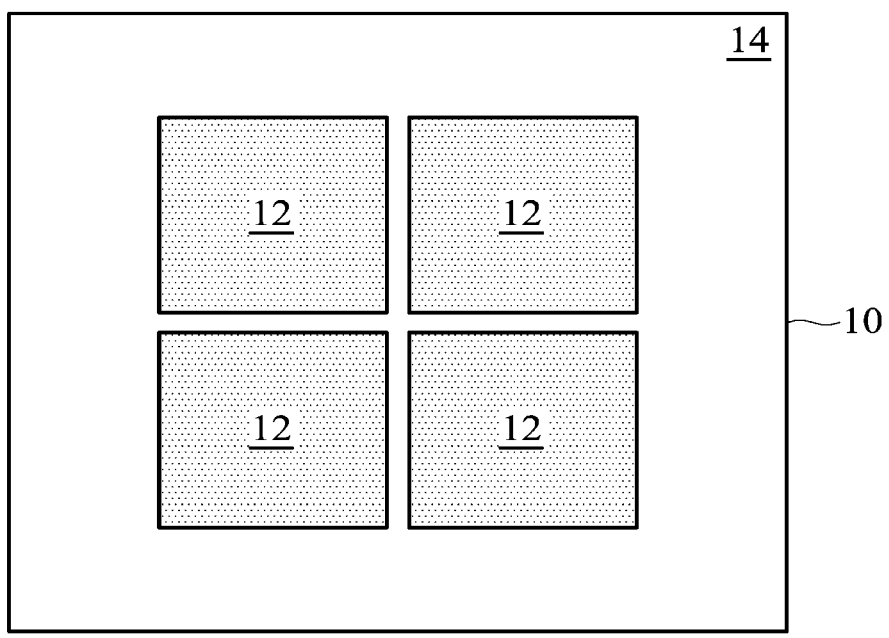
FIG. 6 shows a schematic diagram illustrating the support substrate with a patterned mold release region according to another embodiment of the invention.

First, as shown in FIG. 4a, a support substrate 10 having a top surface 11 is provided. Next, as shown in FIGS. 4b and 4c, a part of the top surface 11 of the support substrate 10 is subjected to a surface treatment, thereby forming a mold release region 12, wherein an adhesive region 14 is the part of the top surface 11 beyond the mold release region 12. FIG. 5 is a top-view of the structure shown in FIG. 4c. The surface treatment includes providing a chemical agent 13 to react with a part of the top surface 11 of the support substrate 10, forming the mold release region 12 (referring to FIG. 4b). The mold release region 12 can be patterned, such as rectangular or circular. Further, the mold release region 12 can be a discontinuous pattern, as shown in FIG. 6.

Figure 4D:
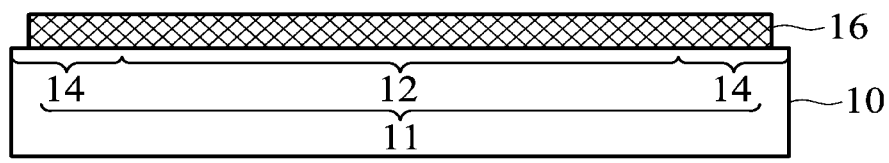

Next, as shown in FIG. 4d, a flexible film 16 is formed on the support substrate 10 of the top surface 11, wherein the flexible film 16 covers the mold release region 12 and the adhesive region 14 simultaneously. It should be noted that the adherence between the flexible film 16 within the mold release region 12 and the support substrate 10 is less than the adherence between the flexible film 16 within the adhesive region 14 and the support substrate 10. Further, the fixation of the whole flexible film 16 for mounting on the top surface 11 is provided by the adhesive region 14. Namely, the flexible film 16 is adhered on the support substrate 10 by the adherence between the flexible film 16 within the adhesive region 14 and the support substrate 10, thereby assuring the success of a sequential process of the flexible film 16. For Example, in an embodiment of the invention, the adherence between the flexible film 16 within the adhesive region 14 and the support substrate 10 can be of between 1B-5, and the adherence between the flexible film 16 within the mold release region 12 and the support substrate 10 can be of between 0B-1. In another embodiment of the invention, the adherence between the flexible film 16 within the adhesive region 14 and the support substrate 10 can be of between 2B-5, and the adherence between the flexible film 16 within the mold release region 12 and the support substrate 10 can be of between 0B-2.

Figure 4E:
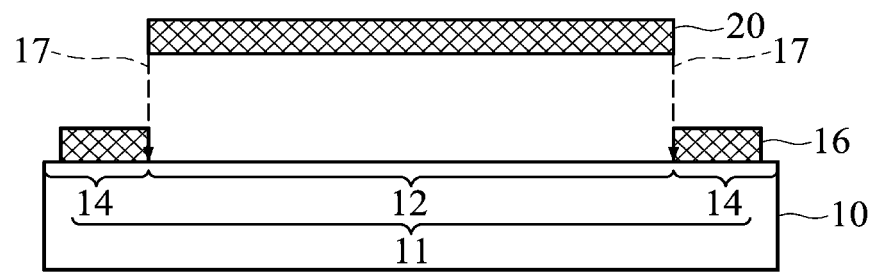
Figure 7:
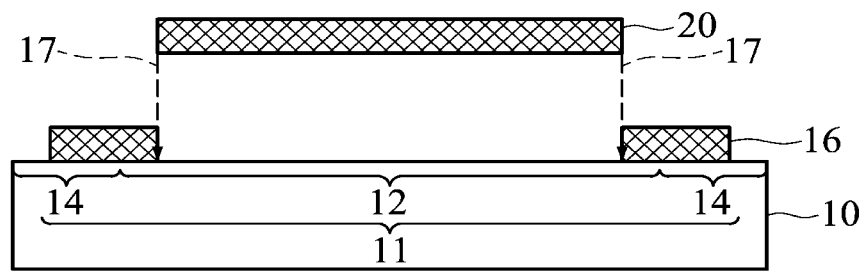
FIG. 7 shows a schematic diagram illustrating the size of the flexible substrate is equal to that of the mold release region.

Finally, as shown in FIG. 4e, the flexible film 16 within the mold release region 12 is cut along a cutting line 17, obtaining a flexible substrate 20. The cutting line 17 can be the edge of the mold release region 12, resulting in the size of the flexible substrate 20 being equal to the size of the mold release region 12. Further, as shown in FIG. 7, the cutting line 17 can be within the mold release region 12, resulting in the size of the flexible substrate 20 being smaller than the size of the mold release region 12.

In an embodiment of the invention, the chemical agent is formed on the top surface 11 of the support substrate 10 by dip coating, spin coating, imprinting, scraping, or roll-coating.

Figure 8A:
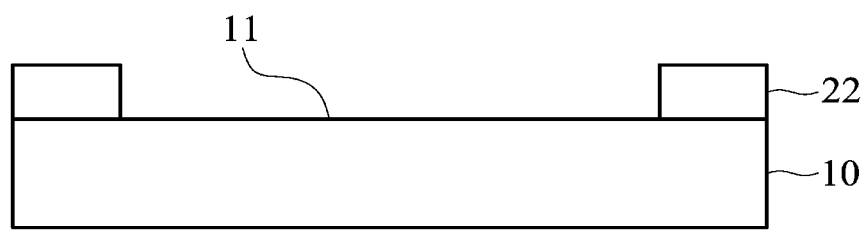
FIGS. 8a-8d are cross sections of a process for forming a chemical agent coating on the support substrate by spin coating according to an embodiment of the invention.
Figure 8B:
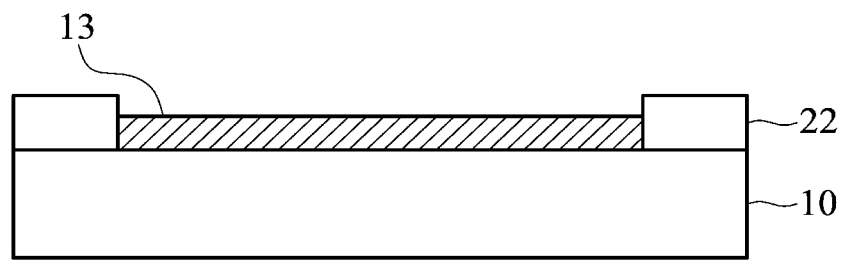
Figure 8C:
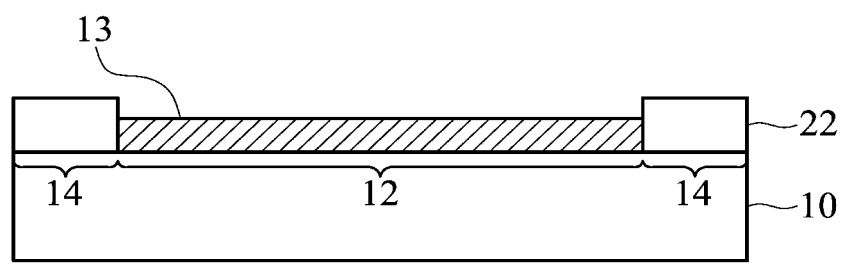
Figure 8D:
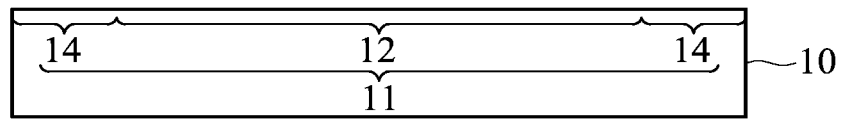

According to an embodiment of the invention, the chemical agent 13 is coated on the support substrate 10 by spin coating. First, as shown in FIG. 8a, a photoresist layer 22 is formed on the support substrate 10 by photolithography, exposing a predetermined mold release region. Next, as shown in FIG. 8b, the chemical agent is coated on the exposed top surface 11 by spin-coating. After the chemical agent reacts with the support substrate 10 to form a mold release region 12, the photoresist layer 22 is removed, as shown in FIGS. 8c and 8d.

Figure 9A:
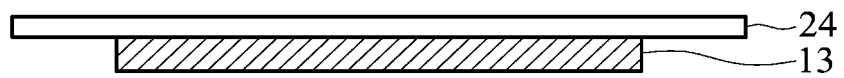
FIGS. 9a-9d are cross sections of a process for forming a chemical agent coating on the support substrate by imprinting according to an embodiment of the invention.
Figure 9A:
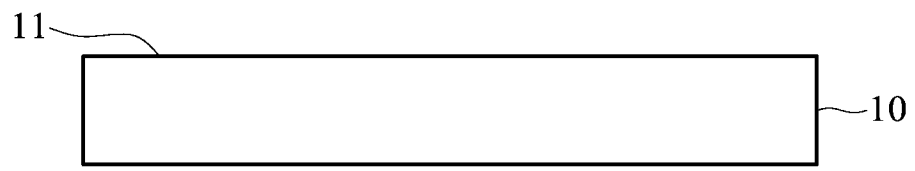
Figure 9B:
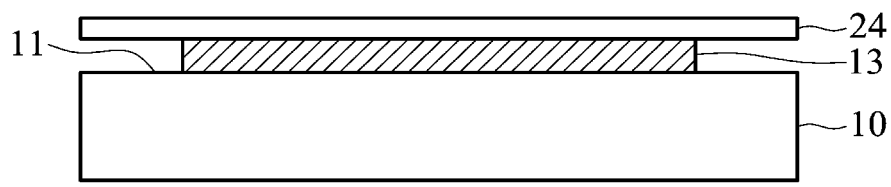
Figure 9C:
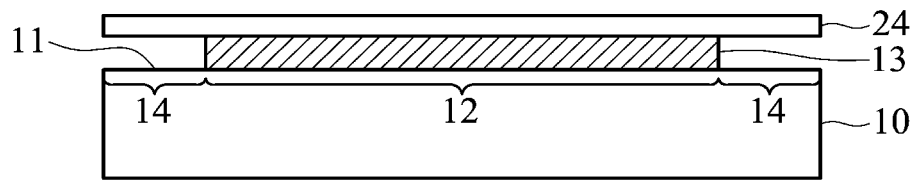
Figure 9D:
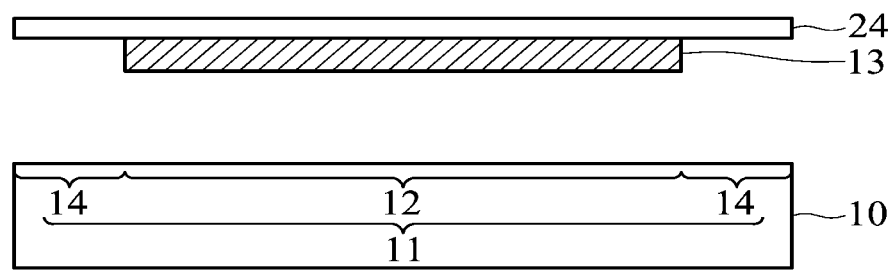

Further, according to an embodiment of the invention, the chemical agent 13 is formed on the support substrate 10 by imprinting. First, as shown in FIG. 9a, a chemical agent coating is formed on a template 24 and aligned to the support substrate 10. Next, as shown in FIG. 9b, the template 24 is imprinted to the top surface 11 of the support substrate 10, forcing the chemical agent coat to react with the predetermined mold release region of the top surface 11. After reaction for forming the mold release region 12, the template 24 is removed, as shown in FIGS. 9c and 9d.

Figure 10A:
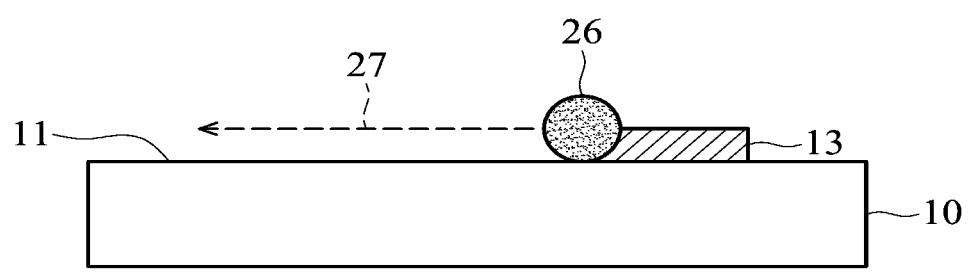
FIGS. 10a-10d are cross sections of a process for forming a chemical agent coating on the support substrate by roll-coating according to an embodiment of the invention.
Figure 10:
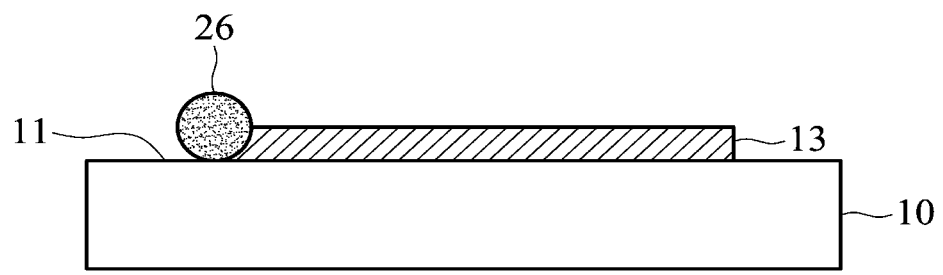
Figure 10:
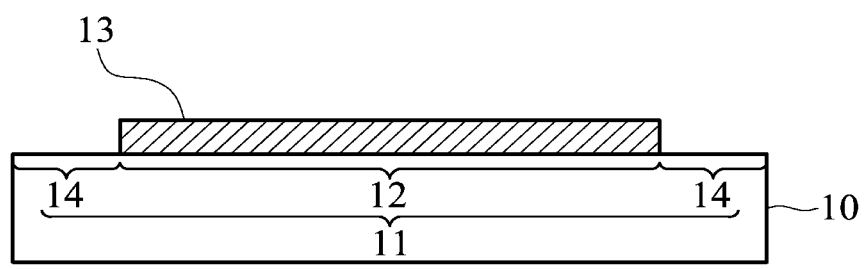
Figure 10:
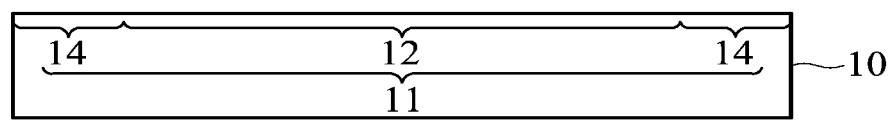
Figure 11:
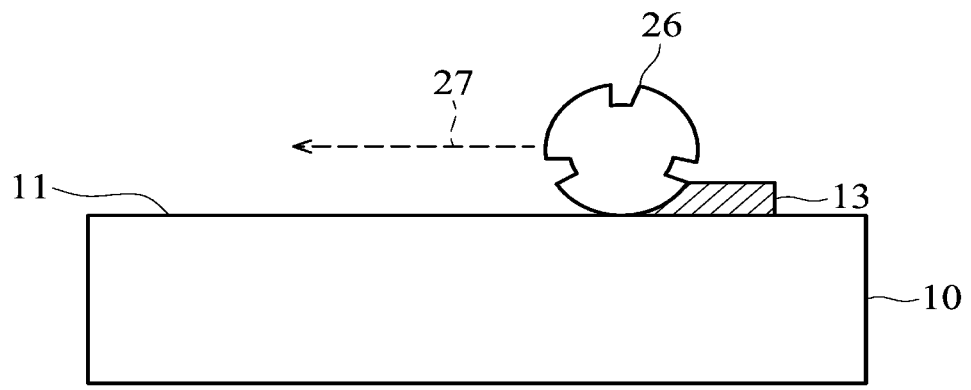
FIGS. 11a-11b are cross sections of a process for forming a patterned chemical agent coating on the support substrate by roller-type relief printing according to an embodiment of the invention.
Figure 11:
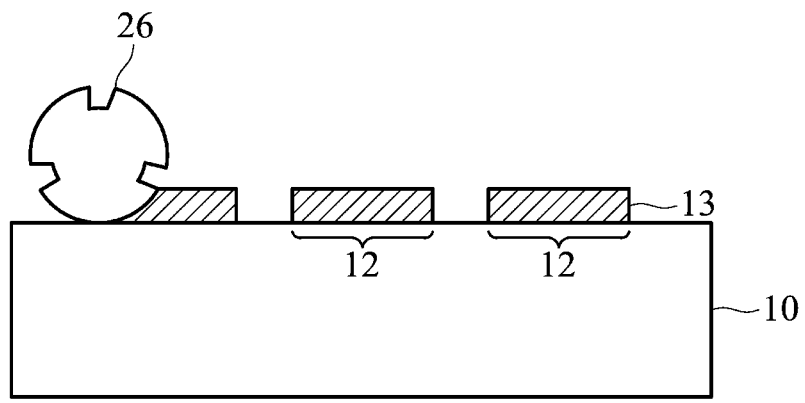

Moreover, according to yet another embodiment, the chemical agent 13 is formed on the support substrate 10 by scraping or roll-coating. First, as shown in FIGS. 10a and 10b, a chemical agent coating is formed on a predetermined mold release region of the top surface 11 by a roller 26 (or a blade) toward a coating direction 27. After reaction, the mold release region 12 is obtained, as shown in FIGS. 10c and 10d. Further, a patterned chemical agent coating can be formed on the support substrate 10 by roller-type relief printing, as shown in FIG. 11a and 11b.

Figure 12:
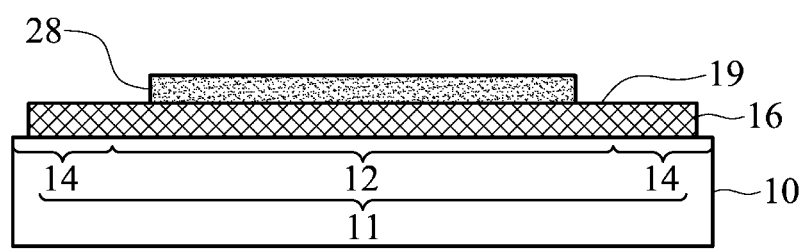
FIGS. 12a-12b are cross sections of a method for fabricating a flexible electronic device according to an embodiment of the invention.
Figure 12:
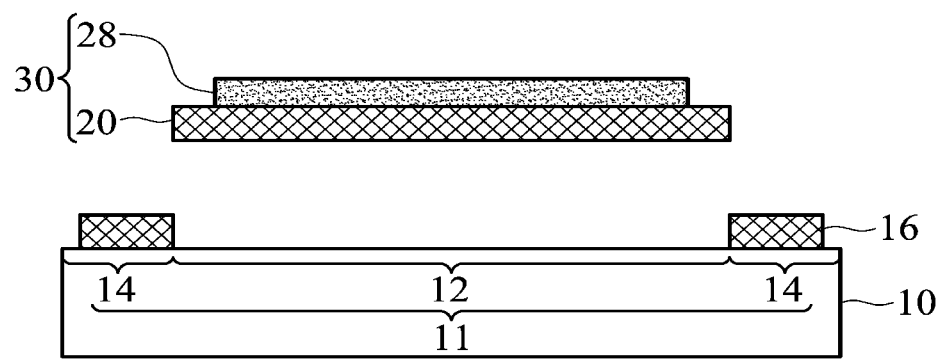

Some embodiments of the invention provide methods for fabricating flexible electronic devices as disclosed below. After the process shown in FIG. 4d, an electronic element 28 is formed on a top surface 19 of the flexible film 16, as shown in FIG. 12a. Next, the flexible film 16 with the electronic element 28 is cut, isolating a flexible electronic device 30, as shown in FIG. 12b. The use of the electronic device is not limited and includes devices which are formed on a flexible structure, as known by those skilled in the art, such as transistor arrays, memory elements, flat panel displays, solar cells, semiconductor currents, or combinations thereof.

Figure 13:
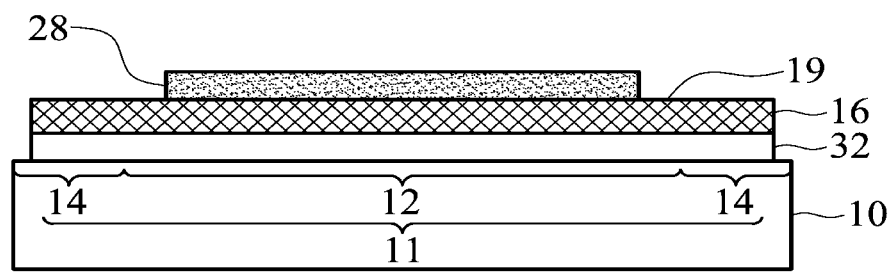
FIG. 13 shows a cross section illustrating that a functional film is disposed between the flexible film and the support substrate.

Further, in another embodiment of the invention, before forming the flexible film 16 on the support substrate 10, a functional film 32 can be formed on the support substrate 10, wherein the functional film 32 simultaneously covers the mold release region 12 and the adhesive region 14, as shown in FIG. 13. It should be noted that the functional film 32 is not a release film. Since the functional film 32 is a part of the flexible electronic device 30, the functional film 32 is not removed after isolating the flexible electronic device 30. The functional film 32 can be a film which is formed on a flexible structure for meeting specific requirements, such as a stress reduction film, an anti-scratch film, an anti-reflection film, a gas barrier film or lamination thereof.

Figure 14:
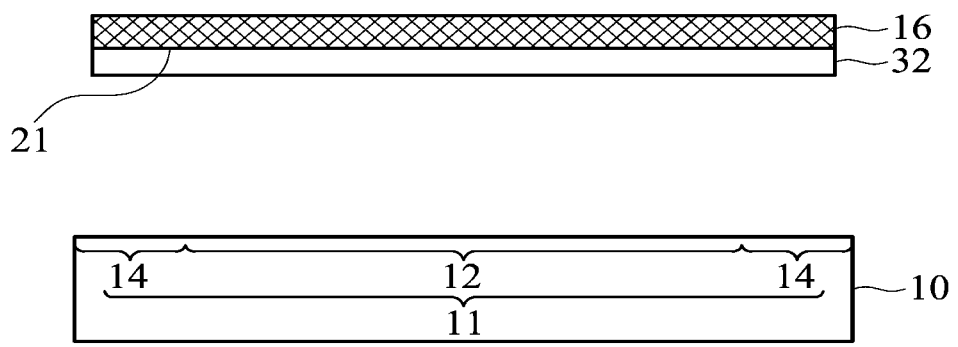
FIG. 14 shows a cross section illustrating that a functional film is formed on the bottom surface of a preformed flexible film before mounting the flexible film to the support substrate.

According to yet another embodiment of the invention, the functional film 32 can be formed on the bottom surface 21 of the flexible film 16 in advance when the flexible film 16 is preformed. When the flexible film 16 is disposed on the support substrate 10, the functional film 32 of the flexible film 16 simultaneously covers the mold release region 12 and the adhesive region 14, as shown in FIG. 14.

Embodiments of the invention provide the methods for isolating a flexible film from a substrate and methods for fabricating an electric device of the invention, the cut flexible film 16 can be isolated completely from the support substrate 10. The functional groups, which are able to react with a flexible film, of the support substrate are consumed, covered or displaced via the surface treatment. The methods for isolating a flexible film from a substrate and methods for fabricating an electric device of the invention have advantages of having a simplified process, and low cost, and use of accessible chemical agents. Further, since the chemical agents employed in the invention exhibit sufficient thermal resistance, there is no gas released during sequential heating processes. Further, after isolating the flexible film or the flexible electronic device from the support substrate, the support substrate with the mold release region is reusable without being subjected to surface treatment processes.

While the invention has been described by way of example and in terms of embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method for fabricating a flexible electronic device, comprising:

provide a support substrate with a top surface;

subjecting a part of the top surface of the support substrate with a surface treatment, thereby forming a mold release region, wherein an adhesive region is the part of the top surface beyond the mold release region;

forming a flexible film on the top surface, wherein the flexible film covers the mold release region and the adhesive region;

forming an electronic element on the flexible film; and cutting the flexible film within the mold release region to isolate a flexible electronic device from the support substrate, wherein the surface treatment comprises providing a chemical agent to react with the top surface of the support substrate; and wherein the chemical agent has the structure represented by

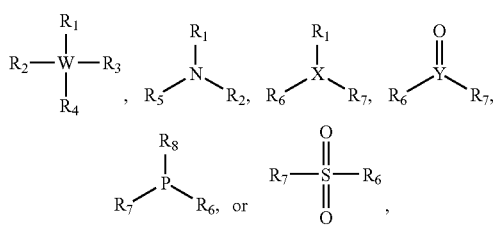

wherein w is C, Si, or Ge; X is S, or Se; Y is C, or S; $R_1$, $R_2$, and $R_3$ are independent and comprise H, alkenyl group, alkyl group, or —OR; R is $C_{1-18}$ alkyl group; $R_4$ is F, Br, I, carboxyl group, amino group, amine group, cyano group, amide group, alkyl halide group, or combinations thereof; $R_5$ is Li; and $R_6$, $R_7$, and $R_8$ are independent and comprise F, Cl, Br, I, alkenyl group, alkyl group, carboxyl group, amino group, amine group, cyano group, amide group, alkyl halide group, or combinations thereof.

2. The method as claimed in claim 1, wherein the support substrate comprises a metallic substrate, a plastic substrate, a ceramic substrate, a glass substrate, or a silicon wafer.

3. The method as claimed in claim 1, after subjecting the top surface of the support substrate to the surface treatment, functional groups of the treated top surface of the support substrate, which are able to form bonds with the flexible film, are consumed, covered or displaced.

4. The method as claimed in claim 3, wherein the functional groups which are able to be bonded with the flexible film comprise hydroxyl group, carboxyl group, amino group, or ester group.

5. The method as claimed in claim 3, wherein the bonds formed between the top surface of the support substrate and the flexible film comprises ionic bond, covalent bond or hydrogen bond.

6. The method as claimed in claim 1, wherein the chemical agent comprises chloromethyl trimethylsilane, 2-bromopropane, trimethyl fluorosilane, trimethyl bromosilane, trimethyl iodosilane, trimethylsilyl cyanide, thionyl chloride, lithium diisopropylamide, phosphorus trichloride, sulfuryl chloride, or combinations thereof.

7. The method as claimed in claim 1, wherein the chemical agent is formed on the top surface of the support substrate by dip coating, spin coating, stamping, scraping, or roll-coating.

8. The method as claimed in claim 1, wherein the flexible film comprises polyimide (PI), polycarbonate (PC), polyethersulfone (PES), polynorbornene (PNB), polyetherimide (PEI), polyethylene naphthalate (PEN) or polyethylene terephthalate (PET).

9. The method as claimed in claim 1, before forming the flexible film on the top surface of the support substrate, further comprising:
    forming a functional film on the support substrate, wherein the functional film comprises a stress reduction film, an anti-scratch film, an anti-reflection film, a gas barrier film or lamination thereof.

10. The method as claimed in claim 1, wherein the flexible film is formed on the top surface of the support substrate by wet coating or evaporation.

11. The method as claimed in claim 1, wherein the flexible film is preformed and is disposed on the top surface of the support substrate by adhering.

12. The method as claimed in claim 1, wherein the adherence between the flexible film within the mold release region and the support substrate is less than the adherence between the flexible film within the adhesive region and the support substrate.

13. The method as claimed in claim 1, wherein the size of the flexible electronic device is equal to the size of the mold release region.

14. The method as claimed in claim 1, wherein the size of the flexible electronic device is less than that of the mold release region.

15. The method as claimed in claim 1, wherein the flexible electronic device comprises a transistor array, a memory element, a flat panel display, a solar cell, a semiconductor current, or combinations thereof.

* * * * *